United States Patent Office 3,331,876
Patented July 18, 1967

3,331,876
RECOVERY OF TOLYLENEDIAMINES
Irvin B. Van Horn and Eugene L. Powers, New Martinsville, W. Va., assignors to Mobay Chemical Company, Pittsburgh, Pa., a corporation of Delaware
No Drawing. Filed Mar. 2, 1966, Ser. No. 531,060
3 Claims. (Cl. 260—582)

This application is a continuation-in-part of copending application Ser. No. 354,141, filed Mar. 23, 1964, now abandoned.

This invention relates to a process for the recovery of tolylenediamines from the distillation residue obtained in the production of tolylenediisocyanate.

The digestion with lye of the distillation residue obtained when an aromatic isocyanate is distilled from the solution in which it was prepared has been heretofore suggested in Annalen der Chemie, volume 562, page 75, 1948. U.S. Patent 3,128,310 also discloses a method of preparing aromatic amines where the distillation residue is heated to 160 to 250° C. with water. This patent also provides for the use of a small amount of alkali, normally an amount of less than one percent by weight based on the weight of the residue to neutralize the chlorine contained in the distillation residue. Still another patent which mentions the old caustic treatment to recover aromatic diamine is U.S. Patent 2,999,873, which contains an incidental disclosure that the residue from the still pot obtained in the production of tolylenediisocyanate by phosgenation of tolylenediamine may be treated with caustic to recover a quantity of the tolylenediamine.

Current production of tolylenediisocyanate in the United States is about 100 million pounds. In distilling the tolylenediisocyanate from the reaction in which it was prepared about 15–25 million pounds of distillation residue are obtained per year. Much of this residue is made up of recoverable ureas and other by-products which are reactive with water to prepare tolylenediamine. It is readily apparent that even a 1 percent increase in yield (based on the distillation residue) represents an additional 150,000 to 250,000 pounds of tolylenediamine. A 5 percent increase in yield could represent approximately a million pounds per year of tolylenediamine assuming all of the residue is reacted with water to recover the tolylenediamine.

It is, therefore, an object of this invention to provide an improved process for the recovery of tolylenediamine from the distillation residue obtained when tolylenediamine is phosgenated to produce tolylenediisocyanate which is then distilled from the reaction mixture in which it was prepared. Another object of this invention is to provide an improved digestion procedure for these distillation residues. Still a further object of this invention is to provide an improvement in the yield obtained when tolylenediamine is prepared by heating water with the distillation residue obtained in the distillation of tolylenedisocyanates. A particular object of this invention is to provide an improved method of recovering 2,4- and 2,6-tolylenediamines from the distillation residues obtained by distilling a tolylenediisocyanate from the solution in which it was prepared.

The foregoing objects and others which will become apparent from the following description are accomplished in accordance with the invention generally speaking, by providing the improvement of using a temperature of from about 260 to about 350° C. for the reaction of water with the distillation residue obtained in the production of tolylenediisocyanate, said reaction being carried out while the residue is mixed with a caustic solution prepared by combining 0.5 to 6.25 mols of alkali metal hydroxide with enough water to make a total of 1000 parts by weight. As stated above, it was known heretofore to react water with the residue obtained when distilling aromatic isocyanates from the reaction mixture in which they are prepared. This invention involves the improvement of carrying out this reaction at a temperature of from about 260 to about 350° C. while the tolylenediisocyanate distillation residue is mixed with the specified amount of caustic.

The process of the invention can be carried out in either a continuous or batch method. It is preferred to use the continuous method because this is more readily adaptable to commercial practice and gives improved recovery rates. The process begins by taking the residue from an isocyanate stripping still and placing it in an autoclave. Then sufficient caustic and water are added to react with the residue. It is possible to begin either with cold residue which has been allowed to cool from the pot temperature to ambient temperatures and stored for any length of time or, alternately, the hot residue from the still pot may be slurried with the water and caustic. In either event, if the residue is in too large chunks, it may be necessary to subdivide it merely for the purpose of ease of handling the slurry. The reaction is speeded up by having the residue reduced in size to less than 16 mesh. This may be accomplished with any suitable grinding means. After the slurry of residue, water and alkali is formed, it is then passed into a heated zone so that the reaction mixture comes to a temperature of 260° C. to 350° C. The heating can be accomplished in any suitable way directly or indirectly including the injection of high pressure steam directly into the slurry. If steam is used the consequent dilution must be taken into account so that the proper concentration of caustic is maintained. It is also desirable to have the reactor under pressure of at least about 100 p.s.i.g. but preferably not more than about 2500 p.s.i.g. The reaction mixture is kept at the temperature and, if desired, pressure until the residue has reacted with the water to produce the tolylenediamine. The time varies from a few seconds to several hours depending on the state of subdivision of the residue, the temperature, pressure and the like. Usually a residence time for a continuous process of one to five minutes is sufficient to insure satisfactory yields if the residue is previously reduced to a particle size of 16 mesh or less. The excess water and the tolylenediamine formed in the process of the invention are then passed to a recovery zone where carbon dioxide formed in the reaction is flashed off together with some water vapor and a crude product containing water, tolylenediamine and by-products is obtained. This crude reaction mixture is then refined by distilling out water and tolylenediamine. The tolylenediamine is purified by conventional techniques to prepare a product suitable for many uses including phosgenation to prepare the corresponding isocyanate.

The invention is particularly suitable to the preparation of 2,4- and 2,6-tolylenediamine essentially free of orthodiamines by reaction of the distillation residue formed when a mixture of about 80 percent 2,4- and 20 percent 2,6-tolylenediamine is phosgenated, for example, according to the process of U.S. Patent 2,908,703 and then the tolylenediisocyanates in the ratio of about 80 percent 2,4- and 20 percent, 2,6-tolylenediisocyanate are distilled from the reaction mixture.

The alkaline solution may be formed with any suitable alkaline material or mixture of materials. The alkali metal bases, including sodium hydroxide, potassium hydroxide and the like are preferred for ease in handling and economics. The tolylenediamine prepared is useful for phosgenation to prepare tolylenediisocyanate which is, in turn, useful for the preparation of polyurethane plastics which may be foams or nonporous elastomers as in U.S. Reissue Patent 24,514 or U.S. Patent 2,729,618. These final products have many well-known commercial uses such as for pillows, in the case of foams and gear wheels in the case of nonporous plastics.

In the following examples, a mixture of 80 percent 2,4-tolylenediisocyanate and 20 percent 2,6-tolylenediisocyanate is prepared by reacting a mixture of about 77 percent 2,4-, 19 percent 2,6-, 2.5 percent 3,4-, and 1.5 percent 2,3-tolylenediamine in orthodichlorobenzene with an excess of phosgene according to the procedure described in U.S. Patent 2,680,127. The distillation residue obtained in this process is then mixed with water in such proportions that there are about 150 parts of residue and about 150 parts of a solution based on the parts of water and parts of caustic shown in the following table. The reaction is heated in an autoclave to the temperature shown in the table and equilibrium pressure for about one hour. The pressure increases as the reaction proceeds due to the evolution of $CO_2$. Pressure is regulated or reduced by release of $CO_2$. After about one hour the water is removed by distillation followed by distillation of the tolylenediamine. The amount of 2,4- and 2,6-tolylenediamine recovered per hundred parts of residue used as a starting material is shown in the table. Throughout, parts are by weight unless otherwise specified.

| Example No. | Temperature, °C. | NaOH, Parts | Water, Parts | Mols NaOH per 1,000 parts of solution | Yield [1] |
|---|---|---|---|---|---|
| 1 | 260 | 7.5 | 142.5 | 1.25 | 53.5 |
| 2 | 275 | 7.5 | 142.5 | 1.25 | 55 |
| 3 | 285 | 7.5 | 142.5 | 1.25 | 56 |
| 4 | 280 | 7.5 | 142.5 | 1.25 | 53.6 |
| 5 | 330 | 7.5 | 142.5 | 1.25 | 57.5 |
| 6 | 240 | 1.5 | 148.5 | 0.25 | 46.5 |
| 7 | 285 | 22.5 | 127.5 | 3.75 | 56.5 |
| 8 | 285 | 15 | 135 | 2.5 | 56 |
| 9 | 285 | 18 | 132 | 3.0 | 56 |
| 10 | 285 | 30 | 120 | 5.0 | 57 |
| 11 | 285 | 36 | 114 | 6.25 | 57.5 |

[1] Percent based on residue, i.e. parts of tolylenediamine recovered per hundred parts of residue charged.

It is to be understood that any other suitable tolylenediisocyanate distillation residue, alkali metal hydroxide or the like could have been used in the foregoing working examples provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. In a process for the preparation of tolylenediamine by a process which comprises heating water and the distillation residue obtained when distilling the product of phosgenation of said tolylenediamine, the improvement which comprises heating said water and said distillation residue at a temperature of 260° C.–350° C. while mixed with 0.5 to 6.25 mols of alkali metal hydroxide and sufficient water to make 1000 parts of alkali metal hydroxide solution.

2. The process of claim 1 wherein said alkali metal hydroxide is sodium hydroxide.

3. The process of claim 1 wherein said tolylenediamine is a mixture of 2,4- and 2,6-tolylenediamine.

References Cited

UNITED STATES PATENTS 3,128,310  4/1964  Koch _____ 260—582

FOREIGN PATENTS 795,639  5/1958  Great Britain.

CHARLES B. PARKER, *Primary Examiner.*

ROBERT V. HINES, *Assistant Examiner.*